United States Patent Office

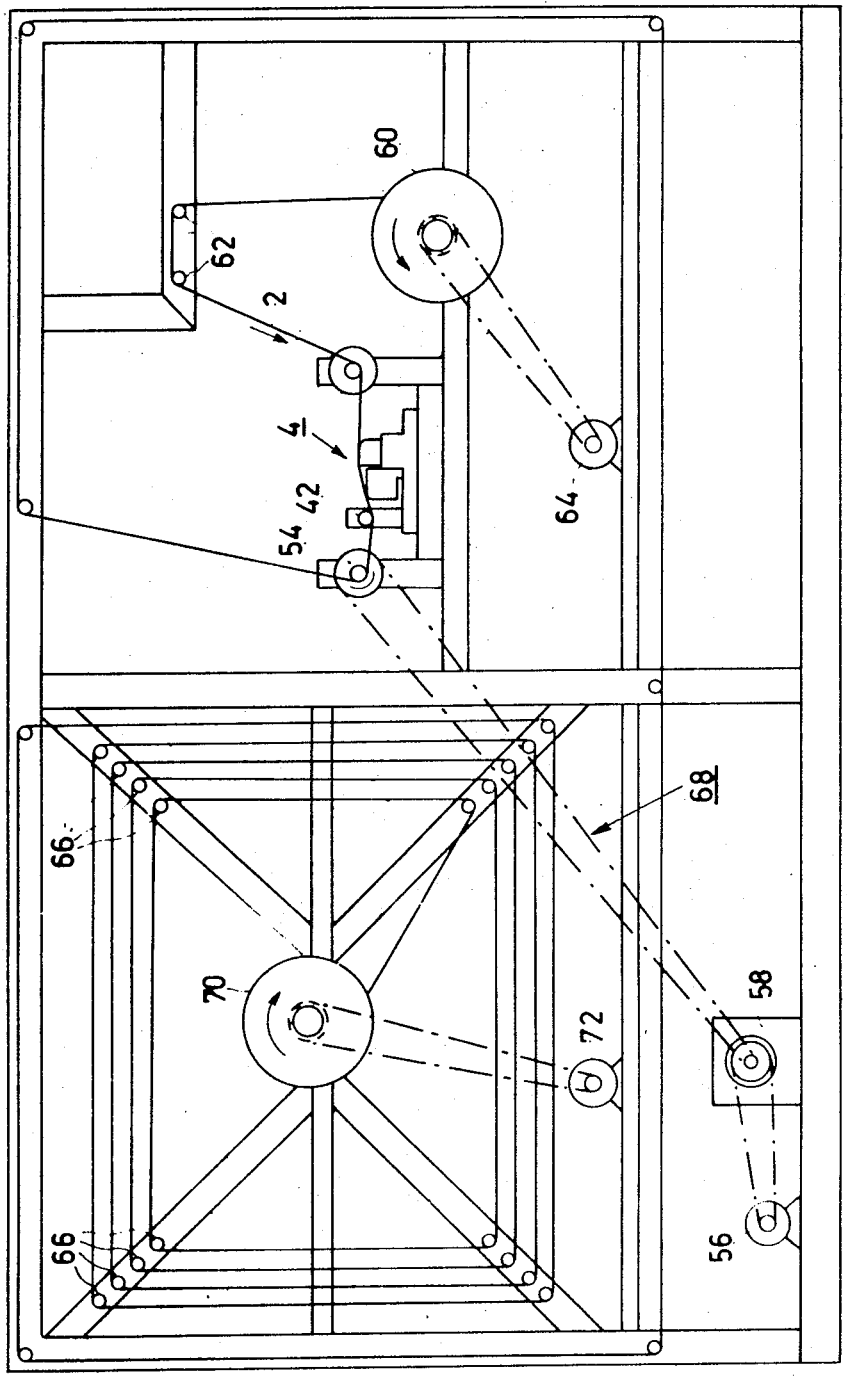

3,679,476
Patented July 25, 1972

---

3,679,476
METHOD OF COATING SYNTHETIC RESIN BASE
Gerard Willem van Oosterhout, Hendrikus Johannes Lemmen, and Cornelis Johannes Klomp, Emmasingel, Eindhoven, Netherlands, assignors to U.S. Philips Corporation, New York, N.Y.
Filed Apr. 1, 1970, Ser. No. 24,674
Claims priority, application Netherlands, June 13, 1969, 6909118
Int. Cl. H01f 10/00
U.S. Cl. 117—236
5 Claims

ABSTRACT OF THE DISCLOSURE

A method of coating a support base of a synthetic material, with a layer of lacquer for particular application in manufacturing magnetic tape. The lacquer is forced through a pouring slit into a pressure chamber where it is temporarily stored in contact with the support base. The support is guided along the stored lacquer under a tensile stress and the support with the adhering layer of lacquer is then guided along a smoothing side in such manner that the parts of the support in front of and behind the smoothing side form an angle so that the layer is equalized. The pressure in the pressure chamber can be controlled by controlling the angle, the tensile stress and the quantity of lacquer supplied per unit of time so that the thickness of the layer is also controlled.

---

Figure 1:
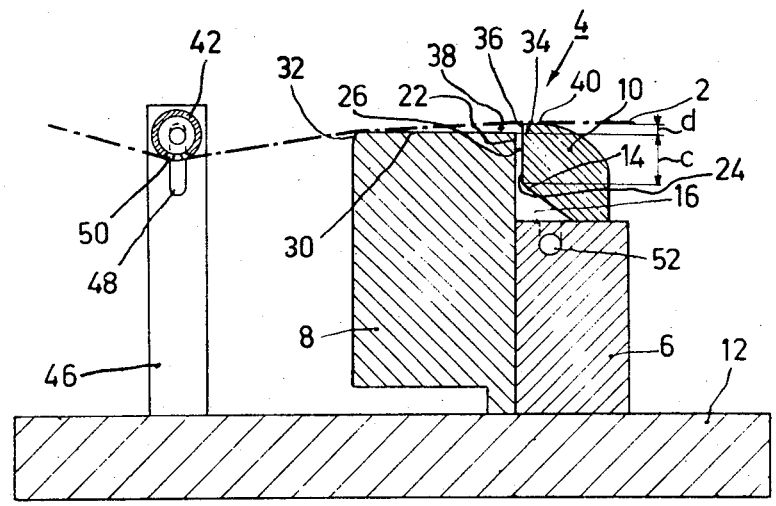

The invention relates to a method of providing a layer of lacquer on a support of a synthetic resin, particularly for use in manufacturing magnetic tape. The lacquer contains a binder, a solvent and magnetic particles. A controllable amount of lacquer is provided on a support which is moved at a controllable speed. The deposition of the lacquer on the support is accomplished by means of a pouring slit which is transverse to the direction of movement of the support and the length of which slit is equal to the width of the layer of lacquer to be provided. The thickness of said layer depends upon the quantity of lacquer supplied and upon the speed of the support.

The object of such methods is to provide a layer of lacquer with a thickness of a few $\mu$m. on a support. It is required that the thickness of the layer of lacquer be as uniform as possible. This is of particular importance in manufacturing magnetic tape since the recording properties also depend upon the homogeneity of the layer of lacquer. The lacquer is provided on a support of a synthetic resin, for example, polyester, in a layer of given thickness, after which the support with the adhering layer of lacquer is conducted through a drying device. In addition to a binder and magnetic particles, the lacquer contains a solvent which evaporates during the drying process. The thickness of the ultimate dry layer of lacquer is equal to 10–15% of the thickness of the original moist layer of lacquer. When, for example, a dry layer with a thickness of 2 $\mu$m. is desired, a wet layer with a thickness of 15–20 $\mu$m. must be provided.

With the conventional methods in which, for example, the lacquer is provided on the support by means of a smooth or engraved roller either with or without a rake, only a limited thickness of lacquer is available. High precision requirements are imposed upon the devices. Damage, if any, to the roller or the rake necessitate the remachining or replacement of these parts. The provision of a layer of lacquer with a reproducible thickness is possible only when lacquers are used having the same rheological properties; this requirement is usually no longer met when lacquers are used having different compositions.

In a known method of providing a layer of lacquer containing magnetic particles on a sound film, a thin strip of lacquer is spread on the moving film and then smoothed to a wider strip by means of an adjustable smoothing element. Since the adjustment of the smoothing element occurs mechanically, the thickness of the layer of lacquer cannot be accurately determined. In the device for carrying out said method there is the danger that air may be dragged along with the support and can be caught between the support and the layer of lacquer.

In order to make the smoothing of the lacquer superfluous it is furthermore known to spread on the carrier a strip of lacquer by means of a pouring slit the length of which corresponds substantially to the width of the layer of lacquer to be provided. Layers of lacquer having a thickness of approximately 50 $\mu$m. of wet layer can be provided with this device which in the optimum case corresponds to a minimum thickness of 5 $\mu$m. of the dry layer. Fluctuations in the speed of the support or in the supply of lacquer result in deviations of the thickness of the layer of lacquer which cannot be compensated for.

It is the object of the present invention to provide a method which overcomes the above mentioned drawbacks and in which a layer of lacquer is provided on a support, which layer is thinner and more uniform than the layers of lacquer obtained by means of the previously known methods and devices.

In order to achieve this, in the method according to the invention the lacquer, after leaving the pouring slit, is temporarily stored in a pressure chamber and the support is guided under a tensile stress along the stored lacquer, with the surface to be covered, and is contacted with the lacquer, the lacquer being kept under pressure. The support with the adhering layer of lacquer is then guided along a smoothing side in such manner that parts of the support in front of and behind the smoothing side enclose an angle. Since the lacquer in the pressure chamber is kept under a pressure, a lacquer cushion is formed and the lacquer is uniformly distributed over the full width of the pressure chamber. The pressure in the prassure chamber furthermore prevents air from being sucked to the pressure chamber. As a result of the tensile stress of the support and the angle which is enclosed by the parts of the support in front of and behind the smoothing side a force is exerted on the support with a normal component as a result of which the support is urged in the direction of the smoothing side and the resistance necessary for building up the pressure is obtained. It has proved possible to provide homogeneous and uniform layers of lacquer in a thickness less than 10 $\mu$m. prior to drying and a thickness of less than 1 $\mu$m. after drying. Experiments have demonstrated the surprising effect that the smoothing side does not wipe off the layer of lacquer but only exerts a smoothing effect and that the smoothing side is even necessary in particular for obtaining uniform and extremely thin layers of lacquer.

With a constant quantity of supplied lacquer, the pressure prevailing in the pressure chamber also depends upon the tensile stress of the support and on the angle which is enclosed by the parts of the support in front of and behind the smoothing side. In a favorable embodiment of the method according to the invention the pressure of the lacquer in the pressure chamber is controlled by controlling the angle which is enclosed by the parts of the support in front of and behind the smoothing side. As a result of this it is possible to influence the effect of the smoothing side, for example, in providing layers of lacquer with different thicknesses or in processing lacquers with different rheological properties.

In a further advantageous embodiment of the method according to the invention the pressure of the lacquer in the pressure chamber is controlled by controlling the tensile stress of the support. The control of the tensile stress has an effect similar to the control of the angle and can take place simultaneously therewith or independently thereof.

In another favorable embodiment of the method according to the invention the pressure of the lacquer in the pressure chamber is controlled by controlling the quantity of lacquer supplied per unit of time. When the other variable factors, in particular the speed of the support, are kept constant, a variation of the thickness of the provided layer of lacquer takes place simultaneously; experiments have demonstrated that in spite of an increase of the supplied quantity of lacquer, said lacquer is not pressed out of the pressure chamber.

In order to prevent a non-uniform pressure distribution in the pressure chamber and in the pouring slit, the lacquer, in a preferred embodiment of the method according to the invention, is guided through a buffer space before passing the pouring slit. As a result of this the pressure of the lacquer on the entrance side of the pouring slit and over the length thereof is equal.

In a device which is particularly suitable for carrying out the method according to the invention, a nozzle is provided with two parallel boundary walls transverse to the direction of movement of the support, which walls form a pouring slit. The boundary wall situated on the supply side of the support comprises an elongated lug which forms a guiding surface for the lacquer. According to the invention this device is characterized by a supporting block and a smoothing block which are each provided with one of the boundary walls for the pouring slit, the smoothing block comprising a flat smoothing table directed at right angles relative to the pouring slit, the end of said table remote from the pouring slit forming a smoothing side. The smoothing table, together with the elongated lug of the supporting block, bounds the pressure chamber. The supporting block further comprises a supporting surface for the support directed at righ angles relative to the pouring slit. The nozzle comprises no moving components so that substantially no detrition occurs. Since the support which is moved under a tensile stress contacts the supporting surface of the supporting block on the supply and is urged in the direction of the smoothing side on the outlet side, the formation of undesired ripples in the longitudinal direction of the support is prevented. In cooperation with the support, the supporting surface forms a seal which prevents air from being dragged to the pressure chamber by the support.

In a favorable embodiment of the device according to the invention one of the two boundary walls is formed by a groove which is provided in one of the two blocks and the rectangular cross-section of which corresponds to the cross-section of the pouring slit, the boundary wall of the other block being flat. By providing a groove in one of the two blocks, a pouring slit of high precision is obtained in a simple manner. If a pouring slit having other dimensions should be necessary or desirable, it is only necessary that the block comprising the groove is exchanged for a block having a different groove A further advantageous embodiment of the device according to the invention is characterized by a guide tube for the support placed behind the smoothing side, which tube, on its part facing the support, comprises outflow apertures for air under pressure and is adjustable in height. By the air under pressure flowing out of the outflow apertures an air cushion is formed between the guide tube and the support so that same is not in contact with the tubular body. By displacing the guide tube in its height it is possible to control the angle which the parts of the support enclose in front of and behind the smoothing side in a simple manner, the air cushion preventing the tensile stress from being influenced in an uncontrolled manner, for example, by friction.

Figure 2:
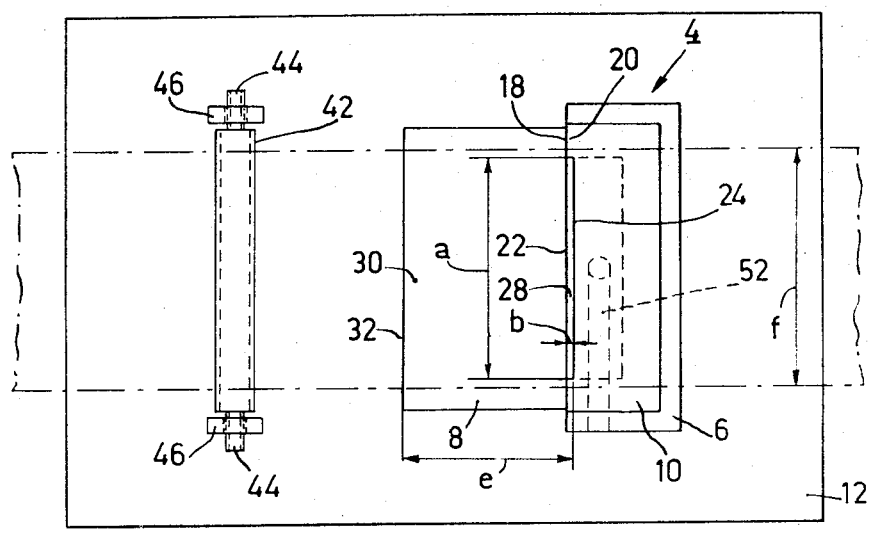

In order that the invention may be readily carried into effect, one embodiment thereof will now be described in greater detail, by way of example, with reference to the accompanying drawings, in which:

FIG. 1 is a longitudinal cross-sectional view of a device according to the invention, FIG. 2 is a plan view of the device, and FIG. 3 shows the device with a transporting and drying apparatus.

The device according to the invention serves for providing a layer of lacquer on a moving support 2 and comprises a nozzle 4 consisting of a supply block 6, a smoothing block 8 and a supporting block 10. The smoothing block 8 is placed on the outlet side and the supporting block 10 is placed on the supply side of the support 2. The supply block 6 and the smoothing block 8 bear on a frame portion 12. The supporting block 10 is placed on the supply block 6 and comprises an inclined wall 14 which, together with the adjacent flat walls of the supply block 6 and the smoothing block 8, bounds a buffer space 16. The central parts of the parallel walls 18 and 20 of the smoothing block 8 and the supporting block 10 facing one another form boundary walls 22 and 24 for a pouring slit 26 having a length $a$, a width $b$ and a height $c$. The pouring slit 26 is formed in a simple manner by a groove 28 which is provided in one of the parallel walls, in the present example in the wall 20 of the supporting block 10. The wall parts 20 of the supporting block 10 which laterally bound the pouring slit are placed against the wall 18 of the smoothing block 8, the groove 28 being closed by the flat boundary wall 22 of the smoothing block 8. The smoothing block 8 comprises a flat upper surface which forms a smoothing table 30 which is directed at right angles relative to the pouring slit 26 and the end of which remote from the pouring slit 26 forms a smoothing side 32. The supporting block 10 comprises a lug 34 having a guide wall 36 in the elongation of the boundary wall 24 of the pouring slit 26. The smoothing table 30 and the guide wall 36 enclose a pressure chamber 38 having a triangular cross-section which is closed on its upper side by the moving support 2 and is not closed on the two longitudinal end sides. The width of the pressure chamber 38 is equal to the length $a$ of the pouring slit 26 and to the width of the lacquer layer to be provided; the maximum height is equal to the height $d$ of the lug 34; the length of the pressure chamber is equal to the distance from the boundary wall 24 to the smoothing side 32. The supporting block 10 furthermore comprises a supporting surface 40 which is directed at right angles relative to the guide wall 36 and which the support 2 contacts. Behind the smoothing side 32, at a given distance therefrom, a guide tube 42 for the support 2 is placed. The ends 44 of the shaft of the guide tube 42 are journalled in two supporting members 46 which are secured to the frame portion 12. In order to be able to adjust the guide tube 42 in its height, it is movable relative to the supporting members 46, for example, by means of slots 48, which are provided in the supporting members 46. The lowermost part of the guide tube 42 facing the support 2 is provided with outflow apertures 50 for air under pressure which is supplied to the hollow ends 44 of the shaft. The outflowing air under pressure forms an air cushion so that the support cannot contact the tubular body as a result of which undesirable frictional resistances are avoided.

The lacquer which contains a binder, a solvent and magnetic particles is pumped by a pumping device not shown through a duct 52 into the supply block 6 to the buffer space 16 where pressure fluctuations are damped. The lacquer is then forced through the pouring slit 26 to the pressure chamber 38 and temporarily stored therein under pressure. The support 2 which consists of a synthetic resin, for example, polyester, has a thickness of, for example, 10 $\mu$m. and a width $f$ which is a few millimetres larger than the length $a$ of the pouring slit 26. The support 2 is unwound from an unwinding reel 60 by a transport roller 54 which is driven by a motor 56 through a control gear 58 provided via guide rollers 62 to the nozzle 4, drawn under a tensile stress along the lacquer stored in the pressure chamber 38 and then guided along the guide tube 42. The support 2 slides on the supporting surface of the supporting block 10 in which the supporting surface performs the action of a rake and prevents the support 2 from dragging along air to the pressure chamber 38. The support 2 then contacts the lacquer in the pressure chamber 38, a layer of lacquer of a given thickness adhering to the support 2. In the method according to the invention the quantity of lacquer which is provided on the support 2 is equal to the quantity of supplied lacquer; this volume of lacquer is equal to the product of speed of the support, width and thickness of the layer of lacquer to be provided. With a given length $a$ of the pouring slit the thickness of the layer of lacquer is dependent upon the quantity of lacquer supplied and on the speed of the support.

When the support 2 leaves the pressure chamber 38 it is guided along the smoothing side 32 in such manner that the parts of the support in front of and behind the smoothing side enclose an angle. As a result of the formation of an angle on the smoothing side 32 and the tensile stress with which the support 2 is moved, a force is exerted on the support 2 with a normal component which urges the support 2 in the direction of the smoothing side 32 so that this exerts a stowing effect. The surface of the layer of lacquer is equalized by the smoothing side 32 so that an extremely uniform layer of lacquer is obtained. A lacquer cushion is formed between the support 2 and the smoothing side 32 by the pressure prevailing in the pressure chamber 38 which cushion prevents a mutual touching of the support 2 and the smoothing side 32.

The pressure in the pressure chamber 38 can be influenced by controlling the tensile stress on the support 2 and controlling the angle which is formed by the support 2 on the smoothing side 32. The tensile stress can be controlled by means of a motor 64 which is coupeld to the unwinding reel 60 and which comprises a controllable eddy current coupling for producing a torque which is opposite to the direction of unwinding of the unwinding reel 60. Formation of ripples in the longitudinal direction of the support 2 during the passage of the pressure chamber and under the influence of the tensile stress is prevented by the supporting surface 40 on which the support 2 bears on the supply side and by the smoothing side 32, in the direction of which the support 2 is urged on the outlet side.

The angle which the support parts enclose in front of and behind the smoothing side 32 simply be controlled by adjusting the guide tube 42 in its height.

When the supplied quantity of lacquer is varied, a variation of the pressure in the pressure chamber also occurs; when the speed of the support remains constant, the thickness of the layer of lacquer to be provided is simultaneously varied. By adapting the speed of the support to the varied quantity of lacquer which is supplied in such manner that the support, when the supply of lacquer is increased, has a higher speed and, when the quantity of lacquer is decreased, has a lower speed, the thickness of the layer of lacquer to be provided can be kept constant.

After passing the nozzle 4, the support 2 with the adhering layer of lacquer is guided, through a series of guide rollers 66, through a drying device 68 and ultimately wound on a winding reel 70 which is driven by a motor 72. During the passage through the drying device 68 the evaporation of the solvent takes place, the thickness of the layer being reduced to 10–15% of the thickness of the originally provided wet layer.

With the method according to the invention it is possible in particular to provide thin layers of lacquer with a thickness of, for example, 5 $\mu$m. prior to drying and a thickness of approximately 0.5 $\mu$m. after drying, dependent upon the composition of the lacquer.

What is claimed is:

1. A method of coating a support base of synthetic resin with a layer of lacquer which contains a binder, a solvent and magnetic particles to thereby form a magnetic tape comprising the steps of: forcing said lacquer through a pouring slit which is arranged transverse to the direction of movement of the support base into a pressure chamber formed on an upper side thereof by said support base, storing the lacquer within said pressure chamber so that said lacquer is in contact with said base which is moved thereover, applying pressure to the lacquer within said chamber so that it is uniformly applied to the supporting base in contact therewith, tensioning the support base, drawing said support base while under tension over the pressure chamber so that the lacquer stored therein under pressure is deposited thereon, controlling the speed at which said base is drawn across the chamber and the quantity of lacquer supplied to the pressure chamber so as to control the thickness of the layer to be deposited on the support base, guiding said base carrying the lacquer over a smoothing side surface in such a manner that an angle is formed between the part of the support base approaching the smoothing side and the part of the support base leaving the smoothing side so as to create a stowing effect of the lacquer, thereby equalizing the surface of the layer of lacquer on said support so as to obtain a uniform layer, and drying the deposited layer of lacquer on the support base.

2. The method according to claim 1 further comprising the step of pumping the lacquer into a buffer space prior to forcing it through said pouring slit so that pressure fluctuations may thereby be damped.

3. The method according to claim 1 comprising the additional step of controlling the pressure of the lacquer in the pressure chamber by controlling the angle formed, between said part of the support base approaching said smoothing side and said part of the support base leaving said smoothing side.

4. The method according to claim 1 further comprising the step of controlling the pressure of the lacquer in the pressure chamber by controlling the tensile force applied to the support base.

5. The method according to claim 1 further comprising the step of controlling the pressure of the lacquer in the pressure chamber by controlling the quantity of lacquer supplied thereto per unit of time.

References Cited

UNITED STATES PATENTS

| | | | |
|---|---|---|---|
| 3,150,995 | 9/1964 | Bauer | 117—235 |
| 3,216,846 | 11/1965 | Hendricx et al. | 117—235 X |
| 3,256,112 | 6/1966 | Camras | 117—235 X |
| 2,774,327 | 12/1956 | Saint-Hilaire | 117—237 X |
| 2,765,769 | 10/1956 | Schroeder | 118—411 |
| 3,234,041 | 2/1966 | Rosecrans | 117—120 X |
| 1,378,304 | 5/1921 | Wood | 118—410 X |
| 2,714,413 | 8/1955 | Hunter et al. | 118—410 UX |
| 3,518,964 | 7/1970 | Nagler | 118—410 X |
| 2,761,791 | 9/1956 | Russell | 118—410 X |

WILLIAM D. MARTIN, Primary Examiner

B. D. PIANALTO, Assistant Examiner

U.S. Cl. X.R.

117—7, 34, 64, 94, 120, 235, 237; 118—407, 410, 411, 412, 413